United States Patent
Hatanaka

(10) Patent No.: US 8,884,451 B2
(45) Date of Patent: Nov. 11, 2014

(54) DIESEL HYBRID VEHICLE SYSTEM

(75) Inventor: Keita Hatanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/696,750

(22) PCT Filed: Jun. 24, 2010

(86) PCT No.: PCT/JP2010/060751
§ 371 (c)(1),
(2), (4) Date: Nov. 7, 2012

(87) PCT Pub. No.: WO2011/161794
PCT Pub. Date: Dec. 29, 2011

(65) Prior Publication Data
US 2013/0049365 A1     Feb. 28, 2013

(51) Int. Cl.
| F02D 29/06 | (2006.01) |
| B60L 11/12 | (2006.01) |
| B60W 10/30 | (2006.01) |
| B60Q 5/00  | (2006.01) |
| B60W 10/08 | (2006.01) |
| B60L 1/00  | (2006.01) |
| H02P 6/10  | (2006.01) |
| B60W 20/00 | (2006.01) |

(52) U.S. Cl.
CPC .............. *B60W 10/08* (2013.01); *B60L 11/12* (2013.01); *H02P 6/10* (2013.01); *B60L 2200/26* (2013.01); *B60W 20/00* (2013.01); *B60W 10/30* (2013.01); *B60Q 5/008* (2013.01); *B60L 1/003* (2013.01)
USPC .............................. 290/40 C; 290/45; 290/7

(58) Field of Classification Search
USPC ..... 290/40 C, 40 B, 40 R, 40 F, 52, 4 A, 1 A; 322/44; 307/10.1; 180/65.21, 65.22, 180/65.245
See application file for complete search history.

(56) References Cited

U.S. PATENT DOCUMENTS 3,829,788 A * 8/1974 Ford ................................ 330/10
5,237,617 A * 8/1993 Miller ............................. 381/61
(Continued)

FOREIGN PATENT DOCUMENTS

| JP | 7-182587 A   | 7/1995 |
| JP | 10-238345 A  | 9/1998 |

(Continued)

OTHER PUBLICATIONS

International Search Report (PCT/ISA/210) issued on Oct. 5, 2010 by the Japanese Patent Office as the International Searching Authority for International Application No. PCT/JP2010/060751.

(Continued)

*Primary Examiner* — Tulsidas C Patel
*Assistant Examiner* — Charles Reid, Jr.
(74) *Attorney, Agent, or Firm* — Buchanan Ingersoll & Rooney PC

(57) ABSTRACT

To provide a diesel hybrid vehicle system that does not need to additionally include a simulated sound generator and that is capable of achieving reduction in size, weight and cost of a vehicle. Not only during running of a vehicle, but even when a diesel engine is stopped at the time of starting up the vehicle or during braking control of the vehicle and when an output of the diesel engine is reduced during coasting of the vehicle, a propeller fan of a radiator is forcibly driven to generate a wind sound caused by the propeller fan.

10 Claims, 3 Drawing Sheets

(56) References Cited

U.S. PATENT DOCUMENTS

| | | |
|---|---|---|
| 5,635,903 A | 6/1997 | Koike et al. |
| 8,204,243 B2 * | 6/2012 | Smith ............................ 381/86 |
| 2005/0116475 A1 * | 6/2005 | Hibi et al. .................. 290/40 C |
| 2005/0200462 A1 | 9/2005 | Maekawa et al. |
| 2007/0175429 A1 * | 8/2007 | Yanagida et al. ........ 123/179.14 |
| 2008/0291589 A1 | 11/2008 | Yokai et al. |
| 2009/0066271 A1 * | 3/2009 | Kajouke et al. ............... 318/139 |
| 2009/0177345 A1 * | 7/2009 | Severinsky et al. ............. 701/22 |
| 2009/0184681 A1 * | 7/2009 | Kuno ............................ 320/128 |
| 2010/0108419 A1 * | 5/2010 | Mari Curbelo et al. .. 180/65.265 |
| 2010/0140003 A1 * | 6/2010 | Saha et al. ............... 180/65.285 |

FOREIGN PATENT DOCUMENTS

| | | |
|---|---|---|
| JP | 2004-040933 A | 2/2004 |
| JP | 2005-278281 A | 10/2005 |
| JP | 2008-295127 A | 12/2008 |
| JP | 2009-081991 A | 4/2009 |
| JP | 2010093908 A | 4/2010 |

OTHER PUBLICATIONS

Written Opinion (PCT/ISA/237) issued on Oct. 5, 2010 by the Japanese Patent Office as the International Searching Authority for International Application No. PCT/JP2010/060751.

Supplementary European Search Report dated Jun. 26, 2014, issued by the European Patent Office in corresponding European Patent Application No. 10853654.1 (7 pages).

* cited by examiner

DIESEL HYBRID VEHICLE SYSTEM

FIELD

The present invention relates to a diesel hybrid vehicle system.

BACKGROUND

At the time of starting up a vehicle (including the time of restarting up the halted vehicle) or at the time of braking the vehicle, a conventional diesel hybrid vehicle system executes control to stop a diesel engine to cause the vehicle to run on electric power supplied from a storage battery in order to reduce exhaust emissions. In a case where a diesel hybrid system is used for a railway vehicle, the diesel hybrid system executes control to stop a diesel engine or to reduce an output of the diesel engine even when the vehicle coasts.

When the diesel engine is stopped or the output of the diesel engine is reduced, the vehicle generates less noise, and accordingly the volume of sound for circumstances around the vehicle to recognize the presence of the vehicle (a vehicle recognition sound) is reduced. In order to compensate for reduction in the volume of the vehicle recognition sound, there has been proposed a conventional diesel hybrid vehicle system in which a simulated sound generator that generates a simulated vehicle running sound is incorporated in a vehicle (for example, Patent Literature 1).

CITATION LIST

Patent Literature

Patent Literature 1: Japanese Patent Application Laid-open No. 7-182587

SUMMARY

Technical Problem

As described above, the conventional diesel hybrid vehicle system needs to additionally include a simulated sound generator as a measure to increase the volume of the vehicle recognition sound, and has a problem that this measure causes increases in the cost, device size, and mass of the system.

The present invention has been achieved in view of the above-mentioned circumstances, and an object of the invention is to provide a diesel hybrid vehicle system that does not need to additionally include a simulated sound generator.

Solution to Problem

In order to solve the above-mentioned problems and achieve the object, the present invention provides a diesel hybrid vehicle system comprising: a diesel engine; a radiator that cools compressed air or coolant of the diesel engine; a motor that drives a vehicle; a generator that is driven by the diesel engine; a power storage device that charges and discharges DC power; a converter that converts AC power generated by the generator into DC power to output the DC power; a first inverter that converts DC power discharged by the power storage device or DC power outputted by the converter into AC power to drive the motor; and a second inverter that converts DC power discharged by the power storage device or DC power outputted by the converter into AC power to drive a propeller fan of the radiator, wherein even when the diesel engine is stopped or an output of the diesel engine is reduced during running or stopping of the vehicle, the second inverter drives the propeller fan.

Advantageous Effects of Invention

According to the present invention, it is possible to provide a diesel hybrid vehicle system that does not need to additionally include a simulated sound generator, and to lead to advantageous effect of reduction in cost, size and weight.

DESCRIPTION OF EMBODIMENTS

Embodiments of a diesel hybrid vehicle system according to the present invention will be explained below in detail with reference to the accompanying drawings. It is noted that the present invention is not limited to the embodiments described below.

First Embodiment

Figure 1:
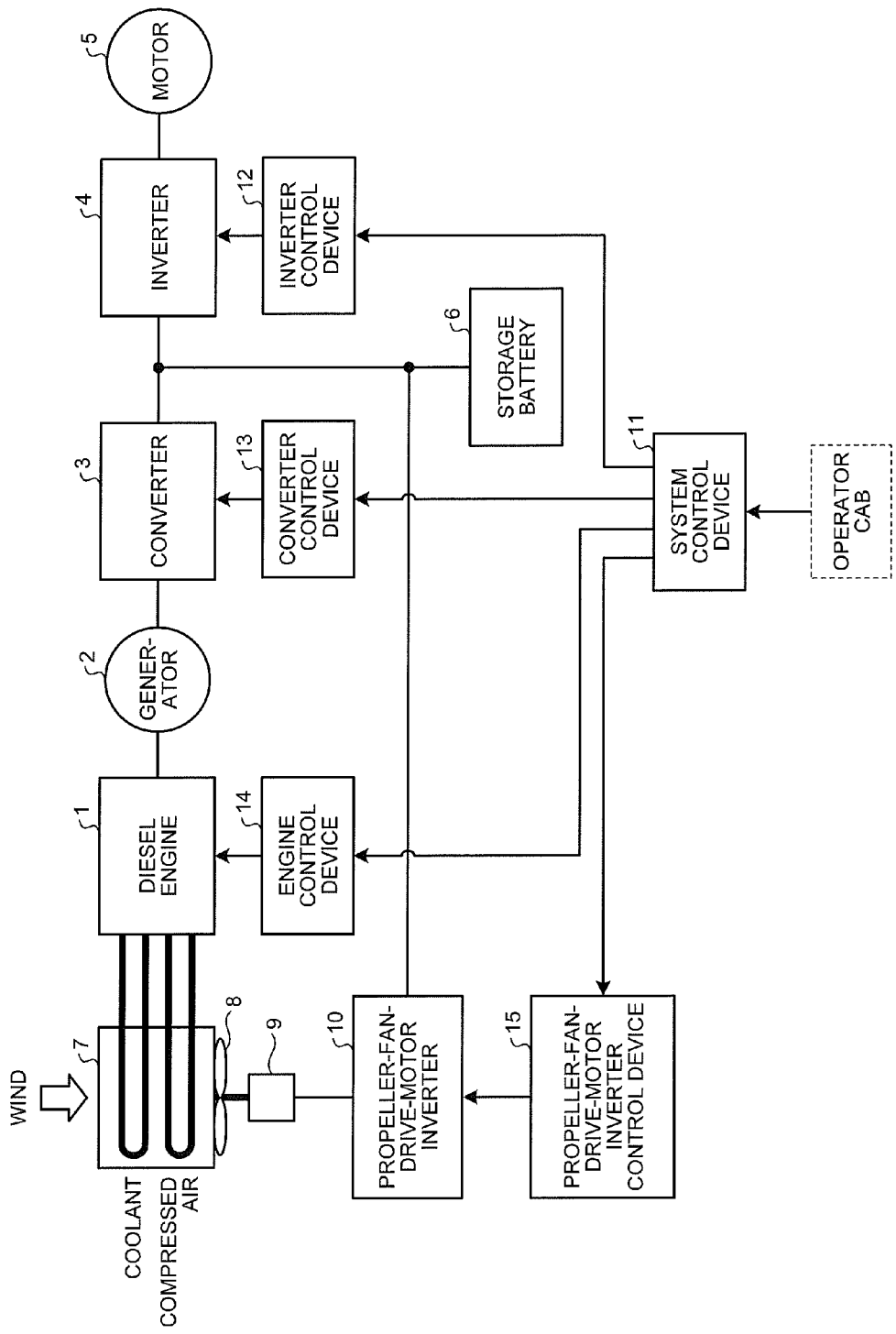
FIG. 1 is a diagram showing one configurational example of a diesel hybrid vehicle system according to a first embodiment.

FIG. 1 is a diagram showing one configurational example of a diesel hybrid vehicle system according to a first embodiment. In FIG. 1, the diesel hybrid vehicle system according to the first embodiment is a diesel hybrid system for a railway vehicle, and includes: a diesel engine 1; a radiator 7 that cools one or both of compressed air and coolant of the diesel engine 1; a propeller fan 8 that causes wind to be drawn into the radiator 7; a propeller-fan drive motor 9 that drives the propeller fan 8; a motor 5 that drives a vehicle; a power generator 2 that is driven by the diesel engine 1; a storage battery (a power storage device) 6 that charges and discharges DC power; a converter 3 that converts AC power generated by the generator 2 into DC power and converts DC power discharged by the storage battery 6 into AC power; an inverter 4 that converts DC power supplied from the converter 3 or the storage battery 6 into AC power to supply the AC power to the motor 5; a propeller-fan-drive-motor inverter 10 that converts DC power supplied from the converter 3 or the storage battery 6 into AC power to supply the AC power to the propeller-fan drive motor 9; an inverter control device 12 that controls the inverter 4; a converter control device 13 that controls the converter 3; an engine control device 14 that controls the diesel engine 1; a propeller-fan-drive-motor inverter control device 15 that controls the propeller-fan drive motor 9; and a system control device 11 that outputs various types of commands to the inverter control device 12, the converter control device 13, the engine control device 14, and the propeller-fan-drive-motor inverter control device 15 according to commands from an operator cab.

To clarify and simplify the following descriptions, "the inverter 4", "the inverter control device 12", "the propeller-fan-drive-motor inverter 10", and "the propeller-fan-drive-motor inverter control device 15" are represented as "the first inverter 4", "the first inverter control device 12", "the second inverter 10", and "the second inverter control device 15", respectively.

Figure 2:
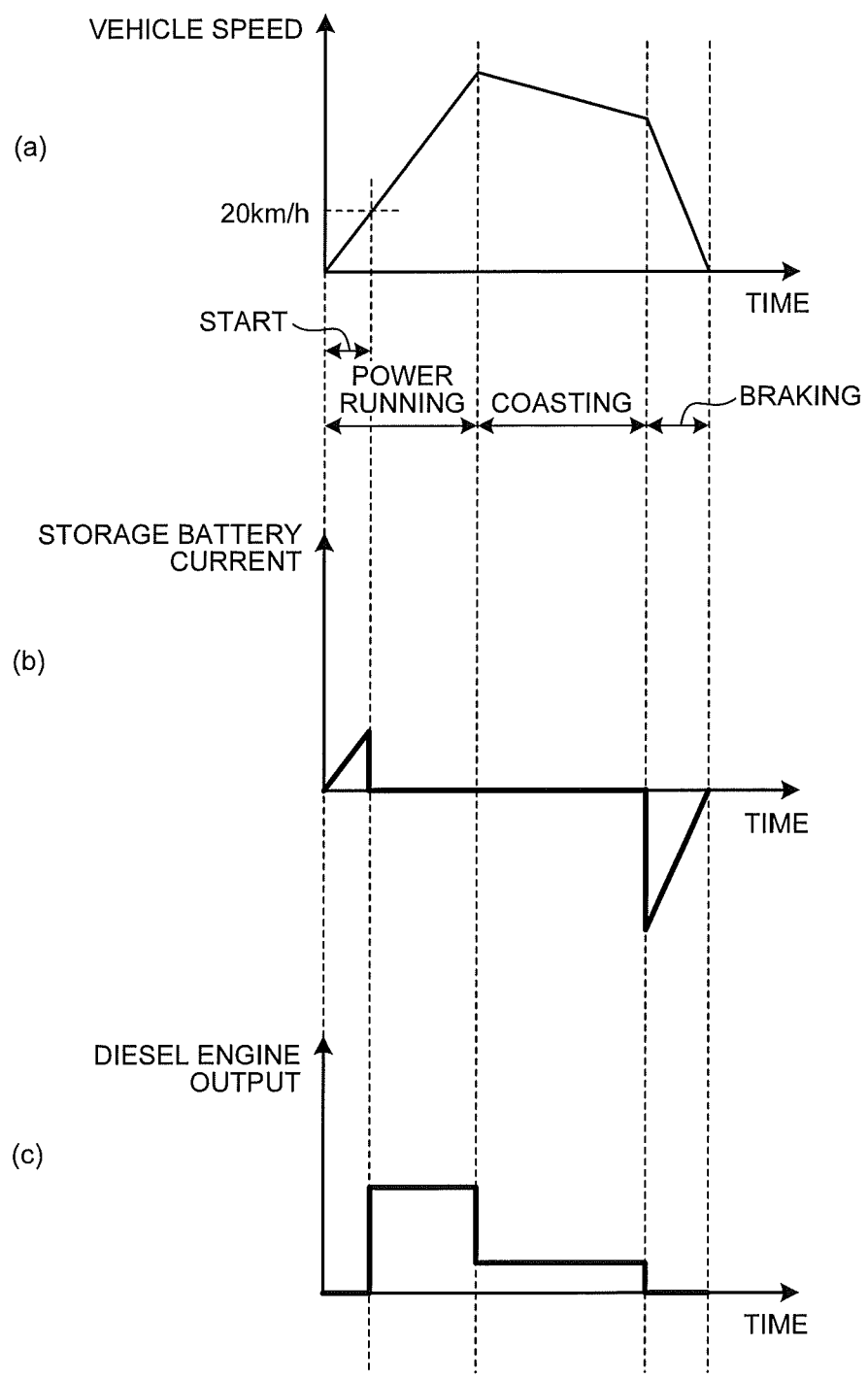
FIG. 2 is graphs showing examples of variations in vehicle speed, storage battery current, and diesel engine output with respect to a time axis from starting-up to halt of a vehicle.

A basic operational example of the diesel hybrid vehicle system is explained next with reference to FIGS. 1 and 2. FIG. 2 is graphs showing examples of variations in vehicle speed, storage battery current, and diesel engine output with respect to a time axis from start-up to halt of a vehicle.

If a power running command is inputted from the operator cab to the system control device 11, then the system control device 11 outputs a motor drive command to the first inverter control device 12. The first inverter control device 12 operates the first inverter 4 to control the voltage amplitude and the frequency of AC power to be supplied to the motor 5. The first inverter 4 converts DC power supplied from the storage battery 6 into AC power to supply the AC power to the motor 5. The vehicle is started up by driving the motor 5 and then starts power-running (FIG. 2(a)). At this time of start-up, the output of the diesel engine 1 is ceased (FIG. 2(c)).

When the vehicle speed reaches a certain speed (for example, 20 km/h) (FIG. 2(a)), the system control device 11 outputs a generator drive command to the converter control device 13, outputs a propeller-fan drive command to the second inverter control device 15, and outputs an engine start command to the engine control device 14. The converter control device 13 operates the converter 3 as an inverter to control the voltage amplitude and the frequency of AC power to be supplied to the generator 2. When the converter 3 operates as an inverter and converts DC power supplied from the storage battery 6 into AC power to supply the AC power to the generator 2, the generator 2 operates as a motor and the engine control device 14 starts the diesel engine 1.

Meanwhile, the second inverter control device 15 controls the voltage amplitude and the frequency of AC power to be supplied to the propeller-fan drive motor 9 and operates the second inverter 10. The second inverter 10 converts DC power supplied from the storage battery 6 into AC power to supply the AC power to the propeller-fan drive motor 9. When the propeller-fan drive motor 9 operates, the propeller fan 8 rotates and causes wind to be drawn into the radiator 7 thereby to cool compressed air or coolant for the diesel engine 1. The radiator 7 can be configured to cool one of the compressed air and the coolant for the diesel engine 1 or can be configured to cool both of them Any configuration thereof may be adopted.

When the diesel engine 1 is started, the generator 2 is switched to operate as an intrinsic generator function. When the diesel engine 1 is started and an output of AC power generated by the generator 2 is high enough for the vehicle to power-run, the converter 3 converts the AC power generated by the generator 2 into DC power to supply the DC power to the first inverter 4 and the second inverter 10. At this time, the amount of DC power as a result of discharged DC power from the storage battery 6 decreases and any storage battery current does not flow (FIG. 2(b)).

When the vehicle speed reaches a predetermined speed, the power-running command outputted from the operator cab to the system control device 11 is turned OFF. The system control device 11 outputs a power-running stop command to the first inverter control device 12, and the first inverter control device 12 stops the first inverter 4. At this time, the vehicle is in a coasting state.

During coasting of the vehicle, electric power to be consumed by air conditioners, lights and the like in the vehicle is supplied from an auxiliary power supply (not shown). The converter 3 converts AC power generated by the generator 2 into DC power to supply the DC power to the auxiliary power supply. Therefore, DC power is not supplied from the storage battery 6, and any storage battery current does not flow (FIG. 2(b)).

Thereafter, if a brake command is inputted from the operator cab to the system control device 11, then the system control device 11 outputs a stop command to the engine control device 14, the converter control device 13, and the second inverter control device 15, and also outputs a regeneration command to the first inverter control device 12. The engine control device 13 stops the diesel engine 1. The converter control device 14 stops the converter 3. The second inverter control device 15 stops the propeller-fan drive motor 9. By the first inverter control device 12 operating the first inverter as a converter, the motor 5 operates as a power generator and the first inverter 4 operates as a converter that converts AC power regenerated by the motor 5 into DC power to charge the storage battery 6. That is, a charging current (a negative storage battery current) flows through the storage battery 6 (FIG. 2(b)).

As described above, the diesel engine 1 is stopped at the time of starting up the vehicle or during braking control of the vehicle. Therefore, although the vehicle is actually running, the vehicle generates less noise. Furthermore, during coasting of the vehicle, because the output of the diesel engine 1 is lower than during power-running of the vehicle, the diesel engine 1 generates a driving sound and the like that are quieter than that during the power running of the vehicle. For this reason, the diesel hybrid vehicle system according to the first embodiment executes the following control.

First, at the time of starting up the vehicle, the diesel engine 1 is stopped. However, at the time when a power-running command is inputted from the operator cab, the system control device 11 outputs a propeller-fan drive command to the second inverter control device 15 to forcibly drive the propeller-fan drive motor 9. By rotating the propeller fan 8, the propeller fan 8 can generate a wind sound. People around a diesel hybrid vehicle can hear this wind sound together with other sounds generated by the vehicle as a vehicle recognition sound. Therefore, by forcibly driving the propeller-fan drive motor 9 to generate a wind sound caused by the propeller fan 8, the volume of the vehicle recognition sound can be increased accordingly.

Even during braking control of the vehicle, the diesel engine 1 is stopped similarly to the time of starting the vehicle up, but control to forcibly drive the propeller-fan drive motor 9 to rotate the propeller fan 8 is executed. By this control, the propeller fan 8 can generate a wind sound even when the diesel engine 1 is stopped, and the volume of the vehicle recognition sound can be increased.

In addition, although the diesel engine 1 is not stopped during coasting of the vehicle, the output of the diesel engine 1 is low. Accordingly, it is thought that the volume of the wind sound caused by the propeller fan 8 is lower than a desired value. Therefore, even during the coasting of the vehicle, it is preferable to execute the control to forcibly drive the propeller-fan drive motor 9 to rotate the propeller fan 8. By this control, a wind sound caused by the propeller fan 8 can be generated in addition to the driving sound generated by the diesel engine 1, and accordingly the volume of the vehicle recognition sound can be increased.

As described above, in the diesel hybrid vehicle system according to the first embodiment, not only during running of a vehicle, but also when a diesel engine is stopped at the time of starting the vehicle or during braking control of the vehicle and when an output of the diesel engine is reduced during coasting of the vehicle, a propeller fan of a radiator is forcibly driven to generate a wind sound caused by the propeller fan.

Therefore, there is no need to additionally include a simulated sound generator. Accordingly, reduction in size, weight and cost of the diesel hybrid vehicle system and the vehicle can be achieved.

On/off timing of switching devices that constitute an inverter is controlled by a triangular waveform signal generally referred to as "carrier signal". The frequency of the carrier signal is referred to as "carrier frequency". If the carrier frequency is within an audible frequency range, an effect of adding an electromagnetic sound generated by a propeller-fan drive motor to a wind sound generated by a propeller fan is obtained.

It is said that the volume of the electromagnetic sound generated by the motor becomes greater as the carrier frequency is lower, and becomes smaller as the carrier frequency is higher. For this reason, it is preferable that the carrier frequency is set to be 10 kHz or lower in order to obtain an effect of increasing the volume of vehicle recognition sound caused by the electromagnetic sound generated by the propeller-fan drive motor.

Generally, it is said that a sound with a high frequency of 8 kHz or higher is difficult for elderly people to hear even if the sound is within an audible frequency range. In addition, a sound with a low frequency of 100 Hz or lower is thought to become uncomfortable sound regardless of age, not limiting to elderly people, whereby some stressful feeling is given to everybody. For this reason, when the carrier frequency is limited to a range between 200 Hz and 8 kHz for example, it is possible to achieve a more preferable volume of vehicle recognition sound for people of all generations including elderly people.

In the embodiment described above, a diesel hybrid vehicle system applied to a railway vehicle has been described as an example. However, it is understood that the invention can also be applied to other hybrid mobile units (automobiles and motorcycles, and the like) that have an engine and a power storage device (a lithium ion battery, a nickel hydride battery, an electric double-layer capacitor, a lithium ion capacitor, a flywheel, or the like) incorporated therein, or can also be used in hybrid construction machines (dump trucks, bulldozers, shovels, and the like) or in the fields of boats and ships.

For example, in the case of diesel hybrid systems for an automobile, many of them have a function of enabling a diesel engine to be halted while the automobile temporarily stops for waiting at the traffic light or for some other reason, even during running of the vehicle. Even during a time when the vehicle temporarily stops in this case, by executing the control to forcibly drive the propeller-fan drive motor 9 to rotate the propeller fan 8, it is possible to constantly generate a wind sound caused by the propeller fan 8, thereby obtaining an effect of continuously executing the control to increase the volume of the vehicle recognition sound.

Second Embodiment

In the first embodiment, there has been explained an example in which the propeller fan 8 of the radiator 7 is forcibly driven to generate a wind sound caused by the propeller fan 8 in a case where the diesel engine 1 is stopped at the time of starting up the vehicle or during braking control of the vehicle, in a case where the output of the diesel engine 1 is reduced during coasting of the vehicle, and in a case where the vehicle temporarily stops during its traveling. In a second embodiment, there will be explained an example in which the generator 2 is driven as a motor to generate an electromagnetic sound in these cases. A configuration of the diesel hybrid vehicle system according to the second embodiment is identical to the configuration of the first embodiment, and therefore detailed description thereof will be omitted.

In the diesel hybrid vehicle system according to the second embodiment, at the time of starting up the vehicle, the system control device 11 outputs a generator drive command to the converter control device 13 at the time when power-running command is inputted from the operator cab, thereby driving the generator 2 as a motor. At this time, the diesel engine 1 is stopped.

As with an inverter, on/off timing of switching devices that constitute a converter is controlled by a triangular waveform signal referred to as "carrier signal". That is, when this carrier frequency is within an audible frequency range, the volume of the vehicle recognition sound can be increased by virtue of an electromagnetic sound generated by the generator 2.

Also during braking control of the vehicle, the diesel engine 1 is stopped similarly to the time of starting up the vehicle, but nevertheless control is made to drive the generator 2 as a motor without stopping the generator 2 similarly to the time of starting the vehicle. By this control, the generator 2 can generate an electromagnetic sound, and accordingly the volume of the vehicle recognition sound can be increased.

Meanwhile, in the diesel hybrid vehicle system according to the present embodiment, the output of the diesel engine 1 is reduced (electric power is generated) during coasting of the vehicle, and therefore the generator 2 is not driven as a motor. In a case where the diesel hybrid vehicle system is configured to stop the diesel engine 1 during coasting of the vehicle, it is preferable that control is made to drive the generator 2 as a motor similarly to the time of starting up the vehicle and during braking control of the vehicle. By this control, the generator 2 can generate an electromagnetic sound, and accordingly the volume of the vehicle recognition sound can be increased.

As described above, according to the diesel hybrid vehicle system of the second embodiment, not only during running of a vehicle, but also when a diesel engine is stopped at the time of starting up the vehicle or during braking control of the vehicle and when the diesel engine is stopped during coasting of the vehicle, control is made to drive a generator as a motor to generate an electromagnetic sound caused by the generator. Therefore, there is no need to additionally include a simulated sound generator. Accordingly, reduction in size, weight and cost of the diesel hybrid vehicle system and the vehicle can be achieved.

Similarly to the case of the inverter, it is preferable that a carrier frequency of the converter is set to be 10 kHz or lower.

Furthermore, similarly to the case of the inverter, when the carrier frequency of the converter is limited to a range between 200 Hz and 8 kHz, for example, a more preferable volume of vehicle recognition sound can be obtained for people of all generations including elderly people.

Third Embodiment

In the first embodiment, an example has been described in which the propeller fan 8 of the radiator 7 is forcibly driven to generate a wind sound caused by the propeller fan 8 in the case where the diesel engine 1 is stopped at the time of starting up the vehicle or during braking control of the vehicle, in the case where the output of the diesel engine 1 is reduced during coasting of the vehicle, and in the case where the vehicle temporarily stops during its traveling. In the second embodiment, an example has been described in which the generator 2 is driven as a motor to generate an electromagnetic sound in these cases. In a third embodiment, an example will be described in which the above-mentioned examples are combined. A configuration of a diesel hybrid vehicle system according to the third embodiment is identical to the configurations of the first and second embodiments, and therefore detailed description thereof will be omitted.

In the operational example described in the first embodiment, supply of DC power from the storage battery 6 is stopped during coasting of the vehicle, and the generator 2 is driven by the output of the diesel engine 1 to supply electric power to an auxiliary power supply (not shown). In this case, because the generator 2 is driven and rotates, the generator 2 generates an electromagnetic sound. Therefore, as long as this electromagnetic sound has a level high enough to function as a vehicle recognition sound, an implementation mode in which only an electromagnetic sound generated by the generator 2 is used as a vehicle recognition sound may be employed. When the level of the electromagnetic sound from the generator 2 is not high enough to be used as a vehicle recognition sound, the control to forcibly drive the propeller fan 8 of the radiator 7 to generate a wind sound caused by the propeller fan 8 is additionally executed, thereby adding the wind sound generated by the propeller fan 8 to the electromagnetic sound of the generator 2 to increase the level of the vehicle recognition sound and enable the tone of the vehicle recognition sound to be adjusted to make the sound easily recognizable.

At the time of starting up the vehicle or during braking control of the vehicle, there is a lot of flexibility to execute both the control to drive the propeller fan 8 and the control to drive the generator 2 as a motor, and it is possible to execute either one or both of the controls to make the level and the tone of the vehicle recognition sound appropriate.

In a case where both a wind sound and an electromagnetic sound are simultaneously generated respectively by the propeller fan 8 and the generator 2, a rotational speed of the propeller-fan drive motor 9 that drives the propeller fan 8 (that is, the carrier frequency of the second inverter 10) and a rotational speed of the generator 2 are controlled to make the both sounds to be generated have different frequency values from each other. In this way, it can be expected to enhance the recognition effect of the vehicle recognition sound.

As described above, according to the diesel hybrid vehicle system of the third embodiment, control to generate a wind sound caused by a propeller fan is executed in combination with control to generate an electromagnetic sound caused by a generator. Therefore, an effect of generating a more effective vehicle recognition sound is obtained in addition to the effects obtained in the first and second embodiments.

Similarly to the first and second embodiments, a carrier frequency of a second inverter and a carrier frequency of a converter are made within an audible frequency range (preferably 10 kHz or lower, and more preferably between 200 Hz and 8 kHz), thereby obtaining an effect of enabling a more preferable volume of vehicle recognition sound to be generated.

Fourth Embodiment

In the first to third embodiments, an example has been described in which a vehicle recognition sound is constantly generated at the time of starting up a vehicle, during its braking control, during its coasting and the like. However, in a fourth embodiment, an example will be described in which a vehicle recognition sound is generated only when necessary.

Figure 3:
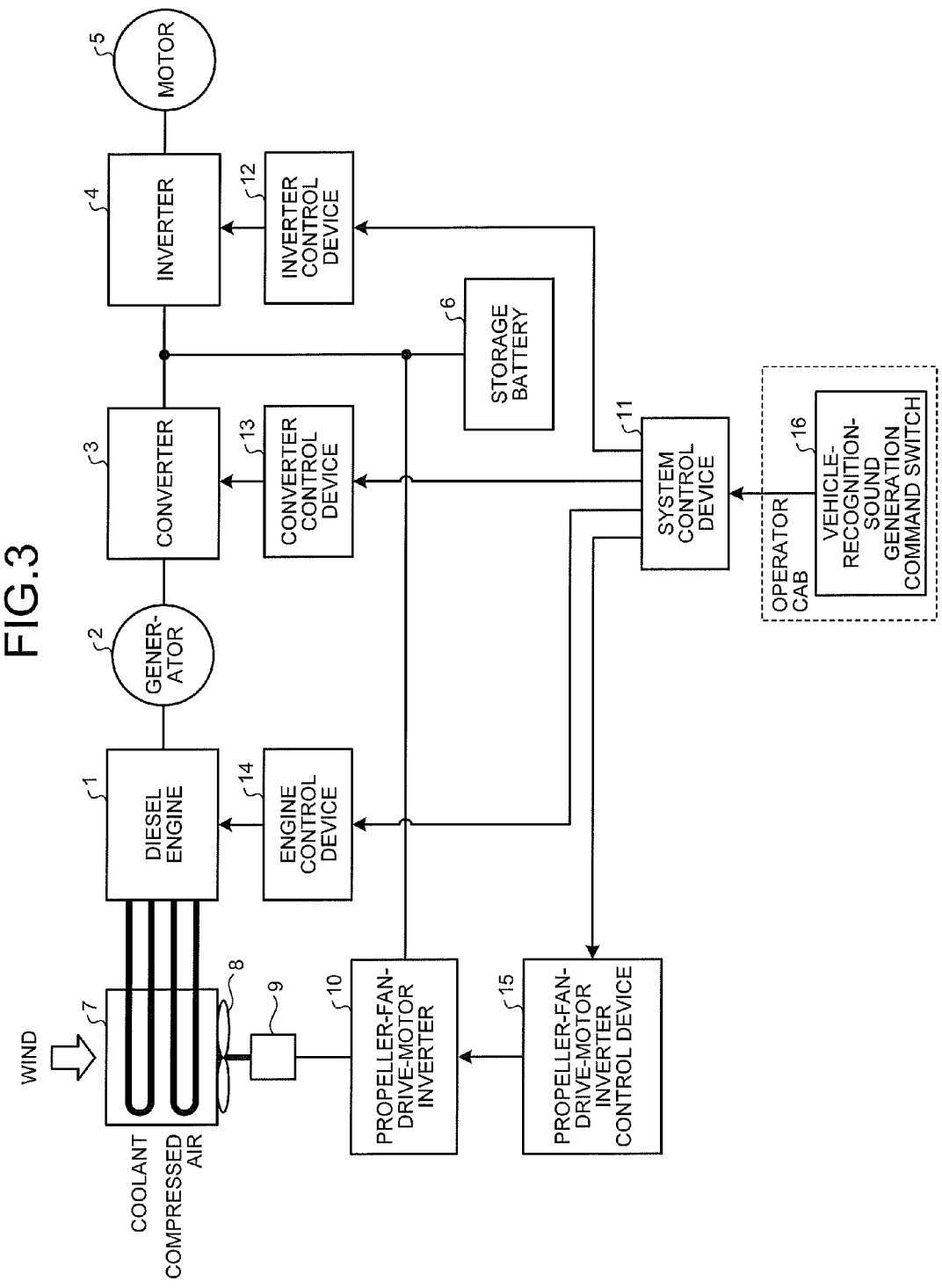
FIG. 3 is a diagram showing one configurational example of a diesel hybrid vehicle system according to a fourth embodiment.

FIG. 3 is a diagram showing one configurational example of a diesel hybrid vehicle system according to the fourth embodiment. As shown in FIG. 3, the diesel hybrid vehicle system according to the fourth embodiment includes a simulated-sound generation command switch 16 in the operator cab in addition to the configuration described in the first embodiment. In the fourth embodiment, constituent elements like or equivalent to those of the first embodiment are denoted by like reference signs, and detailed descriptions thereof will be omitted.

For example, when there is certainly nobody around the vehicle or when the vehicle is obviously present because the location is in a vehicle depot or the like, there is no need to generate a vehicle recognition sound. Therefore, in the diesel hybrid vehicle system according to the fourth embodiment, the vehicle-recognition-sound generation command switch 16 is turned OFF when there is certainly nobody around the vehicle or when the vehicle is obviously present because the location is in a vehicle depot or the like. With this operation, the system control device 11 executes control the control devices 12 to 15 to stop generating a vehicle recognition sound.

As described above, in the diesel hybrid vehicle system according to the fourth embodiment, a vehicle-recognition-sound generation command switch that instructs generation of a vehicle recognition sound is provided to execute control to generate a vehicle recognition sound only when a vehicle-recognition-sound generation command is inputted. Therefore, in a case where there is no need to generate a vehicle recognition sound or a case where any vehicle recognition sound must not be generated, such as when there is certainly not anyone around the vehicle and when the vehicle is obviously present because the location is in a vehicle depot or the like, a propeller fan of a radiator is not driven and a generator is not driven as a motor, so that wasteful energy consumption can be suppressed.

The configurations described in the above embodiments are only examples of the configuration of the present invention, and it is needless to mention that these configurations can be combined with other publicly-known techniques, and can be modified without departing from the scope of the present invention, including omitting a part thereof.

INDUSTRIAL APPLICABILITY

As described above, the diesel hybrid vehicle system according to the present invention is useful as an invention that can provide a diesel hybrid vehicle system that does not need to additionally include any simulated sound generator.

REFERENCE SIGNS LIST 1 diesel engine
2 generator
3 converter
4 inverter (first inverter)
5 motor
6 storage battery (power storage device)
7 radiator
8 propeller fan
9 propeller-fan drive motor
10 propeller-fan-drive-motor inverter (second inverter)
11 system control device
12 inverter control device (first inverter control device)
13 converter control device
14 engine control device
15 propeller-fan-drive-motor inverter control device (second inverter control device)
16 vehicle-recognition-sound generation command switch

The invention claimed is:

1. A diesel hybrid vehicle system comprising:
a diesel engine;
a radiator that cools compressed air or coolant of the diesel engine;
a propeller fan that blows air into the radiator;
a motor that drives a vehicle;
a generator that is driven by the diesel engine;
a power storage device that charges and discharges DC power;
a converter that converts AC power generated by the generator into DC power to output the DC power;
a first inverter that converts DC power discharged by the power storage device or DC power outputted by the converter into AC power to drive the motor; and
a second inverter that converts DC power discharged by the power storage device or DC power outputted by the converter into AC power to drive the propeller fan, wherein
even when the diesel engine is stopped during running or stopping of a vehicle, the converter operates as an inverter to drive the generator as a motor to generate a first electromagnetic sound and the second inverter causes a motor that drives the propeller fan to generate a second electromagnetic sound, and a rotational speed of the generator and a carrier frequency of the second inverter are controlled such that a frequency of the first electromagnetic sound becomes different from a frequency of the second electromagnetic sound.

2. The diesel hybrid vehicle system according to claim 1, wherein a carrier frequency of the second inverter is set to be 10 kHz or lower.

3. The diesel hybrid vehicle system according to claim 2, wherein the carrier frequency of the second inverter is limited within a range between substantially 200 Hz and substantially 8000 Hz.

4. The diesel hybrid vehicle system according to claim 1, wherein a carrier frequency of the converter is set to be 10 kHz or lower.

5. The diesel hybrid vehicle system according to claim 4, wherein the carrier frequency of the converter is limited within a range between substantially 200 Hz and substantially 8000 Hz.

6. The diesel hybrid vehicle system according to claim 1, wherein the diesel hybrid vehicle system is applied to a railway vehicle and is configured to be capable of performing at least one of selection of whether the propeller fan is to be driven or not and selection of whether the generator is to be driven as a motor or not, based on an external command signal.

7. The diesel hybrid vehicle system according to claim 2, wherein the diesel hybrid vehicle system is applied to a railway vehicle and is configured to be capable of performing at least one of selection of whether the propeller fan is to be driven or not and selection of whether the generator is to be driven as a motor or not, based on an external command signal.

8. The diesel hybrid vehicle system according to claim 3, wherein the diesel hybrid vehicle system is applied to a railway vehicle and is configured to be capable of performing at least one of selection of whether the propeller fan is to be driven or not and selection of whether the generator is to be driven as a motor or not, based on an external command signal.

9. The diesel hybrid vehicle system according to claim 4, wherein the diesel hybrid vehicle system is applied to a railway vehicle and is configured to be capable of performing at least one of selection of whether the propeller fan is to be driven or not and selection of whether the generator is to be driven as a motor or not, based on an external command signal.

10. The diesel hybrid vehicle system according to claim 5, wherein the diesel hybrid vehicle system is applied to a railway vehicle and is configured to be capable of performing at least one of selection of whether the propeller fan is to be driven or not and selection of whether the generator is to be driven as a motor or not, based on an external command signal.

* * * * *